(12) United States Patent
Suhara et al.

(10) Patent No.: US 7,306,779 B2
(45) Date of Patent: *Dec. 11, 2007

(54) LITHIUM-COBALT COMPOSITE OXIDE, PROCESS FOR ITS PRODUCTION, POSITIVE ELECTRODE FOR LITHIUM SECONDARY CELL EMPLOYING IT, AND LITHIUM SECONDARY CELL

(75) Inventors: Manabu Suhara, Kanagawa (JP); Kazuo Sunahara, Kanagawa (JP); Naoshi Saitoh, Kanagawa (JP); Tsutomu Katoh, Kanagawa (JP)

(73) Assignee: Seimi Chemical Co., Ltd., Chigasaki (JP)

( * ) Notice: Subject to any disclaimer, the term of this patent is extended or adjusted under 35 U.S.C. 154(b) by 444 days.

This patent is subject to a terminal disclaimer.

(21) Appl. No.: 10/743,479

(22) Filed: Dec. 23, 2003

(65) Prior Publication Data

US 2004/0137325 A1    Jul. 15, 2004

Related U.S. Application Data

(63) Continuation of application No. 10/089,109, filed as application No. PCT/JP00/06959 on Oct. 5, 2000.

(30) Foreign Application Priority Data

| Oct. 8, 1999 | (JP) | 11-287781 |
| Oct. 8, 1999 | (JP) | 11-287785 |
| Feb. 7, 2000 | (JP) | 2000-028860 |

(51) Int. Cl.
  *C01G 51/00* (2006.01)

(52) U.S. Cl. ............... 423/594.6; 252/519.1; 252/519.12; 252/519.15; 429/231.3

(58) Field of Classification Search ............. 423/594.6; 252/519.1, 519.12, 519.15; 429/231.3
See application file for complete search history.

(56) References Cited

U.S. PATENT DOCUMENTS

| 5,147,738 A | 9/1992 | Toyoguchi |
| 5,702,843 A | 12/1997 | Mitate et al. |
| 5,709,969 A | 1/1998 | Yamahira |
| 6,395,426 B1 | 5/2002 | Imachi et al. |
| 2002/0081495 A1 | 6/2002 | Nakajima et al. |
| 2004/0137325 A1 | 7/2004 | Suhara et al. |

FOREIGN PATENT DOCUMENTS

| EP | 1069633 | * | 1/2001 |
| JP | 5-067467 |   | 3/1993 |
| JP | 10-001316 |   | 1/1998 |
| JP | 10-279315 |   | 10/1998 |
| JP | 10-310430 |   | 11/1998 |
| JP | 11-049519 |   | 2/1999 |
| JP | 2000-268821 | * | 9/2000 |
| WO | 99-049528 |   | 9/1999 |

OTHER PUBLICATIONS

Translation of Japan 2000-268821, Sep. 29, 2000.*
JPO Web Site—Uncertified Computer Translation of JP 10-001316 A, Jan. 1998.
U.S. Appl. No. 11/621,586, filed Jan. 10, 2007, Suhara et al.

* cited by examiner

*Primary Examiner*—Steven Bos
(74) *Attorney, Agent, or Firm*—Oblon, Spivak, McClelland, Maier & Neustadt, P.C.

(57) ABSTRACT

A composite oxide suitable for an active material of a positive electrode for a lithium secondary cell which can be used in a wide range of voltage, has a large electric capacity and excellent low temperature performance and is excellent in the durability for charge-discharge cycles and highly safe, a process for its production, and a positive electrode and a cell employing it, are presented.

The composite oxide is a lithium-cobalt composite oxide which is represented by the formula $LiCo_{1-x}M_xO_2$, (wherein $0 \leq x \leq 0.02$ and M is at least one member selected from the group consisting of Ta, Ti, Nb, Zr and Hf), and which has a half-width of the diffraction peak for (110) face at $2\theta=66.5\pm1°$, of from 0.070 to 0.180°, as measured by the X-ray diffraction using $CuK_\alpha$ as a ray source.

11 Claims, No Drawings

LITHIUM-COBALT COMPOSITE OXIDE, PROCESS FOR ITS PRODUCTION, POSITIVE ELECTRODE FOR LITHIUM SECONDARY CELL EMPLOYING IT, AND LITHIUM SECONDARY CELL

This is a continuation application of U.S. application Ser. No. 10/089,109, filed Mar. 26, 2002.

TECHNICAL FIELD

The present invention relates to a lithium-cobalt composite oxide for a lithium secondary cell, a process for its production, a positive electrode for a lithium secondary cell employing it, and a lithium secondary cell.

BACKGROUND ART

In recent years, along with the progress in portable or codeless equipments, a demand is mounting for a non-aqueous electrolyte secondary cell which is small in size and light in weight and has a high energy density. As an active material for a non-aqueous electrolyte secondary cell, a composite oxide of lithium and a transition metal, such as $LiCoO_2$, $LiNiO_2$, $LiNi_{0.8}Co_{0.2}O_2$, $LiMn_2O_4$ or $LiMnO_2$, has been known. Especially, a lithium secondary cell employing a lithium-cobalt composite oxide ($LiCoO_2$) as a positive electrode active material and employing a lithium alloy or a carbon such as graphite or carbon fiber as a negative electrode, provides a high voltage at a level of 4 V and is widely used as a cell having a high energy density.

However, a conventional lithium secondary cell has had a problem of deterioration of the cycle characteristics such that the cell discharge capacity gradually decreases as a charge/discharge cycle is repeated, or a problem that the safety is insufficient. Further, higher densification is required with respect to the volume capacity density.

In order to improve such cell properties, JP-A-10-1316 proposes to use as an active material $LiCoO_2$ which is obtained by dispersing in an aqueous lithium hydroxide solution e.g. cobalt hydroxide or cobalt oxyhydroxide wherein the valence of cobalt is trivalent, followed by heat treatment, for the purpose of improving the cycle characteristics, etc., of a lithium secondary cell.

Further, JP-A-10-279315 and JP-A-11-49519 propose to obtain a lithium secondary cell having a high capacity and good cycle characteristics by using as an active material $LiCoO_2$ which is obtained by mixing e.g. dicobalt trioxide ($Co_3O_2$) or cobalt oxyhydroxide wherein the valence of cobalt is trivalent, with e.g. lithium oxide and firing such a mixture at a temperature of from 250 to 1,000° C.

Further, JP-A-10-312805 proposes to improve the cycle characteristics of a lithium secondary cell by using as a positive electrode active material $LiCoO_2$ of a hexagonal system having a crystallite diameter of from 45 to 100 nm in a (110) direction of the crystallite, wherein the length of c axis of lattice constant is at most 14.051 Å.

Further, JP-A-7-32017 proposes to use as a positive electrode active material $LiCoO_2$ having from 5 to 35% of Co atoms replaced with W, Mn, Ta, Ti or Nb, for improvement of the cycle characteristics of a lithium secondary cell. Further, JP-A-6-64928 proposes to improve the self-discharge characteristics of a lithium secondary cell by using as a positive electrode active material a Ti-containing lithium-cobalt composite oxide prepared by a synthesis employing a molten salt.

However, with respect to a lithium secondary cell using as a positive electrode active material a lithium-cobalt composite oxide, no product has been known which fully satisfies all of requirements for cycle characteristics, the initial weight capacity density, the stability and the low temperature operation efficiency, and for a production method for efficient mass production.

It is an object of the present invention to provide a lithium-cobalt composite oxide for a lithium secondary cell which has a large electric capacity and good discharge characteristics at low temperatures, is excellent in the charge/discharge cycle durability, and has an initial weight capacity density, a volume capacity density and high safety, a process for its production, a positive electrode for a lithium secondary cell employing it, and such a cell.

DISCLOSURE OF THE INVENTION

The present inventors have found that when a lithium-cobalt composite oxide having a specific composition and crystal structure, is used as a positive electrode for a lithium secondary cell, the cell properties will be excellent, and particularly, a lithium-cobalt composite oxide obtained by a specific production process is excellent in the productivity, and a lithium secondary cell wherein such a composite oxide is used as a positive electrode active material, is especially excellent in cycle characteristics and is also excellent in safety and low temperature operation efficiency.

The present invention provides a hexagonal lithium-cobalt composite oxide for a lithium secondary cell, which is represented by the formula $LiCo_{1-x}M_xO_2$, wherein x is $0 \leq x \leq 0.02$ and M is at least one member selected from the group consisting of Ta, Ti, Nb, Zr and Hf, and which has a half-width of the diffraction peak for (110) face at $2\theta=66.5\pm1°$, of from 0.070 to 0.180°, as measured by the X-ray diffraction using $CuK_\alpha$ as a ray source.

Further, the present invention provides a positive electrode for a lithium secondary cell, which contains the above hexagonal lithium-cobalt composite oxide for a lithium secondary cell, as an active material.

In the formula of the above lithium-cobalt composite oxide, if x is larger than 0.02, the initial electric capacity decreases, such being undesirable. Further, with a view to improvement of safety and production efficiency, x is preferably 0. Further, from the effects for improvement of cycle durability and low temperature operation efficiency, x is preferably $0.0005 \leq x \leq 0.02$, particularly preferably $0.001 \leq x \leq 0.01$, further preferably $0.002 \leq x \leq 0.007$.

The half-width of the diffraction peak for (110) face at $2\theta=66.5\pm1°$, as measured by the X-ray diffraction using $CuK_\alpha$ as a ray source, of the above lithium-cobalt composite oxide, reflects the crystallite diameter in a certain specific direction of the lithium-cobalt composite oxide, and a relation has been found such that the larger the half width of the peak, the smaller the crystallite diameter. In the present invention, the half-width of the peak means the width of the peak at ½ of the height of the peak.

The half-width of the diffraction peak for (110) face of the lithium-cobalt composite oxide of the present invention is from 0.070 to 0.180°. If such a half-width is less than 0.070°, the charge/discharge cycle durability, initial electric capacity, average discharge voltage or safety of the cell employing it as a positive electrode active material, tends to deteriorate, such being undesirable. If such a half-width exceeds 0.180°, the initial electric capacity and safety of the cell tend to be low, such being undesirable. In a case where x is at least 0.005, a particularly preferred range is from 0.100 to 0.165°.

In a case where x is 0, from 0.070 to 0.110° is preferred, and a particularly preferred range is from 0.080 to 0.110°.

Further, the present invention provides a process for producing a hexagonal lithium-cobalt composite oxide for a lithium secondary cell, which comprises dry blending a cobalt oxyhydroxide powder having an average particle size of from 1 to 20 µm and a specific surface area of from 2 to 200 m$^2$/g, a lithium carbonate powder having an average particle size of from 1 to 50 µm and a specific surface area of from 00.1 to 10 m$^2$/g, and a powder of an oxide of metal element M having an average particle size of at most 10 µm and a specific surface area of from 1 to 200 m$^2$/g, which may be added as the case requires, followed by firing from 850 to 1,000° C. in an oxygen-containing atmosphere, preferably from 4 to 30 hours.

In the present invention, the average particle size means a weight average particle diameter. In the present invention, the average particle size is a particle size at a point where the cumulative curve of mass becomes 50% in the cumulative curve for the total mass of 100% prepared by obtaining the particle size distribution based on mass. This may be referred to also as a mass base cumulative 50% diameter (for example, Chemical Engineering Handbook "Fifth Edition" (compiled by Chemical Engineering Association) p 220-221, Kirk-Othmer, "Encyclopedia of Chemical Technology", 3rd. Edition, vol. 21, 106-113 (Wiley-Interscience). The measurement of the particle size is carried out by thoroughly dispersing in a medium such as water by means of e.g. ultrasonic treatment and measuring the particle size distribution (for example, by using Microtruck HRAX-100, manufactured by Nikkiso co., Ltd.).

For the process of the present invention, it is preferred to use the above-described specific cobalt oxyhydroxide as a cobalt material. If the average particle size of the cobalt oxyhydroxide is less than 1 µm, the safety of the cell tends to decrease, or the packing density of the electrode layer tends to decrease, whereby the electrical capacity per volume tends to decrease, such being undesirable. Further, if the average particle size of the cobalt oxyhydroxide exceeds 20 µm, the discharge characteristics of the cell at a large current tend to decrease, such being undesirable. A preferred average particle size of the cobalt oxyhydroxide is from 4 to 15 µm.

The above-described cobalt oxyhydroxide may sometimes be produced in a hydrous state. In such a case, the specific surface area can hardly be measured. Accordingly, in the present invention, the specific surface area of hydrous cobalt oxyhydroxide means the specific surface area with respect to a powder obtained by drying the hydrate of cobalt oxyhydroxide at 120° C. for 16 hours for dehydration. Further, when hydrous cobalt oxyhydroxide is to be used, it is preferred to use a powder after drying it. For example, it is preferred to employ it after drying at 120° C. for 16 hours. In the present invention, if the specific surface area of the cobalt oxyhydroxide is less than 2 m$^2$/g, the discharge capacity at a large current tends to decrease, such being undesirable. Further, if the specific surface area of the cobalt oxyhydroxide exceeds 200 m$^2$/g, the packing density of the positive electrode layer tends to decrease, whereby the electric capacity per volume tends to decrease, such being undesirable. A preferred specific surface area of the cobalt oxyhydroxide is from 20 to 100 m$^2$/g.

For the process of the present invention, it is preferred to use lithium carbonate having a specific nature, as a lithium material. If the average particle size of the lithium carbonate is less than 1 µm, the bulk density of the powder tends to decrease, and the productivity in mass production tends to decrease, such being undesirable. Further, if the average particle size of the lithium carbonate exceeds 100 µm, the initial electric capacity tends to decrease, such being undesirable. A particularly preferred average particle size of the lithium carbonate is from 5 to 30 µm. If the specific surface area of the lithium carbonate is less than 0.1 m$^2$/g, the initial discharge capacity per unit weight tends to decrease, such being undesirable. Further, if the specific surface area of the lithium carbonate exceeds 10 m$^2$/g, the packing density of the positive electrode layer tends to decrease, whereby the electric capacity per volume tends to decrease, such being undesirable. A particularly preferred specific surface area of the lithium carbonate is from 0.3 to 3 m$^2$/g.

In the process for producing a lithium-cobalt composite oxide of the present invention, in a case where M is contained, it is preferred to use a metal oxide having a specific nature as a metal oxide containing element M, as a raw material. The metal oxide containing element M may preferably be titanium oxide $TiO_2$ when M is titanium (Ti). Titanium oxide includes an anatase type, a rutile type, etc. It is particularly preferred to use an anatase type, since the cell properties will be good. When M is niobium (Nb), $Nb_2O_3$ may preferably be mentioned. When M is tantalum (Ta), $Ta_2O_5$ may preferably be mentioned. When M is zirconium (Zr), zirconium oxide $ZrO_2$ may preferably be mentioned. When M is hafnium (Hf), $HfO_2$ may preferably be mentioned.

If the average particle size of the metal oxide containing element M exceeds 10 µm, the distribution of element M in the lithium-cobalt composite oxide particles tends to be non-uniform, whereby the effects of adding element M relating to the cell performance tend to decrease, such being undesirable. A preferred average particle size of the oxide of element M is at most 1 µm, particularly preferably at most 0.3 µm.

If the specific surface area of the metal oxide containing element M is less than 1 m$^2$/g, the reactivity tends to decrease, whereby the effects of adding element M relating to the cell performance tend to decrease, such being undesirable. On the other hand, if the specific surface area of the metal oxide containing element M exceeds 100 m$^2$/g, element M tends to be uniformly incorporated into the crystal lattice, whereby the effects of adding element M relating to the cell performance tend to decrease, such being undesirable. A preferred specific surface area of the oxide of element M is from 2 to 20 m$^2$/g.

The lithium-cobalt composite oxide of the present invention is preferably obtained by preferably dry blending the cobalt oxyhydroxide powder, the lithium carbonate powder and the oxide powder containing element M, followed by firing from 850 to 1,000° C. preferably for from 4 to 30 hours in an oxygen-containing atmosphere. Wet blending is not preferred, since the productivity is low. If the firing temperature is lower than 850° C., the charge/discharge cycle durability tends to be low, such being undesirable. On the other hand, if the firing temperature exceeds 1,000° C., the initial electric capacity tends to decrease, such being undesirable. Particularly preferred is from 870 to 960° C., and more preferred is from 880 to 920° C. If the firing time is less than 4 hours, the firing state tends to be non-uniform during mass production, whereby fluctuation is likely to result in the properties, such being undesirable. If it exceeds 30 hours, the productivity tends to decrease, such being undesirable. It is particularly preferred to employ a firing time of from 8 to 20 hours.

The firing of the above mixture is carried out preferably in an oxygen stream. The oxygen concentration in the stream is preferably from 10 to 100 volume %, particularly preferably from 19 to 50 volume %. If the oxygen concentration is low, the cell performance tends to deteriorate, such being undesirable.

A lithium secondary cell employing a positive electrode containing as an active material the lithium-cobalt composite oxide obtained by the process of the present invention and having the specific value of the half-width of the diffraction peak for (110) face, has a higher low temperature operation efficiency than ever, and is excellent in the charge/discharge cycle durability, while maintaining the initial electric capacity.

Among the lithium-cobalt composite oxides of the present invention, one wherein the packing press density of the lithium-cobalt composite oxide is from 2.90 to 3.35 g/cm$^3$, is preferred, since the capacity density per unit volume of the electrode layer of the positive electrode, can be made high. In the present invention, the packing press density means an apparent density of a press-molded product when the lithium-cobalt composite oxide powder is pressed under a load of 0.3 t/cm$^2$. If the packing press density is less than 2.90 g/cm$^3$, the density of the electrode layer of the positive electrode tends to be low, whereby the capacity per volume tends to be low, such being undesirable. If the packing press density exceeds 3.35 g/cm$^3$, the capacity development at a high current density of the cell tends to deteriorate, such being undesirable. The packing press density of the lithium-cobalt composite oxide is particularly preferably from 3.05 to 3.25 g/cm$^3$.

In the lithium secondary cell of the present invention, it is preferred that a dispersion made of a kneaded product or a slurry comprising the powder of the lithium-cobalt composite oxide of the present invention, an electrically conductive material, a binder and a solvent or dispersant for the binder, is coated on a positive electrode current collector made of e.g. an aluminum foil or a stainless steel foil, and then dried to have it supported on the current collector to obtain a positive electrode. As the electrically conductive material, a carbon type conductive material such as acetylene black, graphite or ketjenblack, is, for example, preferably employed. As the binder, polyvinylidene fluoride, polytetrafluoroethylene, polyamide, carboxymethyl cellulose or an acrylic resin may, for example, preferably be employed. As the separator, a porous polyethylene film or a porous polypropylene film may, for example, preferably be employed.

In the lithium secondary cell of the present invention, as the solvent for the electrolyte solution, a carbonic ester is preferred. The carbonic ester may be cyclic or chain. The cyclic carbonic ester may, for example, be propylene carbonate or ethylene carbonate (EC). The chain carbonic ester may, for example, be dimethyl carbonate, diethyl carbonate (DEC), ethylmethyl carbonate, methylpropyl carbonate or methylisopropyl carbonate.

In the lithium secondary cell of the present invention, the above carbonic esters may be used alone or in combination as a mixture of two or more of them. Further, such an ester may be mixed with other solvent. Further, depending upon the material for the negative electrode active material, there may be a case where the charge/discharge characteristics, cycle durability or charge/discharge efficiency can be improved by a combined use of a chain carbonic ester and a cyclic carbonic ester.

Further, to such an organic solvent, a vinylidene fluoride/hexafluoropropylene copolymer. (for example, Keiner, tradename, manufactured by Atochem Company) and vinylidene fluoride/perfluoropropyl vinyl ether copolymer disclosed in JP-A-10-294131, may be added, and the following solute may be added to obtain a gel polymer electrolyte.

As the solute for the above electrolyte solution or polymer electrolyte, it is preferred to use at least one member of lithium salts containing e.g. $ClO_4-$, $Cf_3SO_3-$, $BF_4-$, $PF_6-$, $AsF_6-$, $SbF_6-$, $CF_3CO_2-$ or $(CF_3SO_2)_2N-$ as an anion. For the above electrolyte solution or polymer electrolyte, it is preferred to add the electrolyte made of a lithium salt to the above solvent or solvent-containing polymer at a concentration of from 0.2 to 2.0 mol/l. If the concentration departs from this range, the ion conductivity tends to decrease, and the electrical conductivity of the electrolyte tends to decrease. The concentration is more preferably adjusted to be from 0.5 to 1.5 mol/l.

In the lithium secondary cell employing a positive electrode active material of the present invention, as the negative electrode active material, a material capable of absorbing and desorbing lithium ions, is employed. The material for such a negative electrode active material is not particularly limited, but, it may, for example, be a lithium metal, a lithium alloy, a carbon material, an oxide composed mainly of a metal of Group 14 or 15 of the Periodic Table, a carbon compound, a silicon carbide compound, a silicon oxide compound, titanium sulfide or a boron carbide compound. As the carbon material, one obtained by thermally decomposing an organic material by various thermal decomposition conditions, or artificial graphite, natural graphite, soil graphite, expanded graphite or scaly graphite, may, for example, be used. Further, as the oxide, a compound composed mainly of tin oxide, may be used. As the negative electrode current collector, a copper foil or a nickel foil may, for example, be used.

The negative electrode in the present invention is obtained preferably by kneading the above-mentioned negative electrode active material with an organic solvent in the same manner as in the case of the above positive electrode, to obtain a slurry, and coating the slurry on a metal foil current collector, followed by drying and pressing. There is no particular restriction as to the shape of the lithium secondary cell of the present invention. A sheet shape (so-called film shape), folded-shape, wounded bottomed cylindrical shape or a button shape, may suitably be selected depending upon the particular application.

Now, the present invention will be described in further detail with reference to Examples, but it should be understood that the present invention is by no means restricted to such Examples. The following Examples 1 to 14 are Examples of the present invention, and Examples 15 and 16 are Comparative Examples.

EXAMPLE 1

A cobalt oxyhydroxide powder having an average particle size of 10 μm and a specific surface area of 66 m$^2$/g, a lithium carbonate powder having an average particle size of 15 μm and a specific surface area of 1.2 m$^2$/g and an anatase-type titanium dioxide powder having an average particle size of 0.22 μm and a specific surface area of 9 m$^2$/g, were mixed. The mixing ratio was such that the composition would be LiCo$_{0.998}$Ti$_{0.002}$O$_2$ after firing. These three types of powders were dry-blended and then fired at 910° C. for 12 hours in an atmosphere having the oxygen concentration adjusted to 28 volume % by adding oxygen gas to air.

With respect to the powder after the firing (the positive electrode active material powder), the X-ray diffraction spectrum was obtained by using RINT 2100 model X-ray diffraction apparatus, manufactured by Rigaku Corporation. By this powder X-ray diffraction using CuK$_\alpha$ ray, a diffraction peak of a hexagonal system was obtained. Further, the half-width of the diffraction peak for (110) face in the vicinity of 2θ=66.5±1°, was 0.121°.

This positive electrode active material powder was pressed under 0.3 t/cm$^2$, and the packing press density was determined from the volume and the weight and found to be 3.20 g/cm$^3$. The LiCo$_{0.998}$Ti$_{0.002}$O$_2$ powder thus obtained, acetylene black and a polytetrafluoroethylene powder, were mixed in a weight ratio of 80/16/4 and kneaded while adding toluene, followed by drying to obtain a positive electrode plate having a thickness of 150 μm.

And, two stainless steel simple closed cells were assembled in an argon grove box, by using an aluminum foil having a thickness of 20 μm as a positive electrode current collector, using a porous polypropylene film having a thickness of 25 μm as a separator, using a metal lithium foil having a thickness of 500 μm as a negative electrode, using a nickel foil of 20 μm as a negative electrode current collector, and using 1M LiPF$_6$/EC+DEC (1:1) as an electrolyte.

With respect to these two cells, firstly, charging was carried out to 4.3 V at a load current of 75 mA per g of the electrode active material at 25° C., and discharging was carried out to 2.5 V at an applied current of 75 mA per g of the positive electrode active material, whereby the initial discharge capacity was obtained. With respect to one cell, the charge/discharge cycle test was further carried out 40 times. Further, the other cell was charged at 25° C. and then cooled to −10° C. Then, discharging was carried out to 2.5 V by a load current of 75 mA per g of the positive electrode active material, whereby the initial discharge capacity at −10° C. was obtained, and the capacity development rate at −10° C. was obtained, on the basis that the initial electric capacity at 25° C. was 100%.

The initial discharge capacity at from 2.5 to 4.3 V at 25° C. was 149 mAh/g, and the capacity retention after 40 charge/discharge cycles, was 95.3%. Further, the capacity developing rate at −10° C. was 70%.

EXAMPLE 2

A cobalt oxyhydroxide powder having an average particle size of 10 μm and a specific surface area of 66 m$^2$/g, a lithium carbonate powder having an average particle size of 15 μm and a specific surface area of 1.2 m$^2$/g and an niobium oxide Nb$_2$O$_5$ powder having an average particle size of 0.15 μm and a specific surface area of 5.3 m$^2$/g, were mixed. The mixing ratio was such that the composition would be LiCo$_{0.998}$Nb$_{0.002}$O$_2$ after firing. These three types of powders were dry-blended and then fired at 910° C. for 12 hours in an atmosphere having the oxygen concentration adjusted to 28 volume % by adding oxygen gas to air.

With respect to the powder after the firing (the positive electrode active material powder), the measurement was carried out in the same manner as in Example 1, whereby the half-width of the diffraction peak for (110) face in the vicinity of 2θ=66.5±1°, was 0.115°.

The packing press density of this positive electrode active material powder was determined in the same manner as in Example 1, and found to be 3.23 g/cm$^3$.

Two stainless steel simple closed cells were assembled in the same manner as in Example 1 except that the above LiCo$_{0.998}$Nb$_{0.002}$O$_2$ powder was used instead of the LiCo$_{0.998}$Ti$_{0.002}$O$_2$ powder in Example 1.

With respect to these two cells, the measurement was carried out in the same manner as in Example 1, whereby the initial discharge capacity at from 2.5 to 4.3 V at 25° C. was 148 mAh/g, and the capacity retention after 40 charge/discharge cycles, was 95.0%. Further, the capacity developing rate at −10° C. was 73%.

EXAMPLE 3

A cobalt oxyhydroxide powder having an average particle size of 10 μm and a specific surface area of 66 m$^2$/g, a lithium carbonate powder having an average particle size of 15 μm and a specific surface area of 1.2 m$^2$/g and a tantalum oxide Ta$_2$O$_5$ powder having an average particle size of 0.23 μm and a specific surface area of 9.8 m$^2$/g, were mixed. The mixing ratio was such that the composition would be LiCo$_{0.998}$Ta$_{0.002}$O$_2$ after firing. These three types of powders were dry-blended and then fired at 910° C. for 12 hours in an atmosphere having the oxygen concentration adjusted to 28 volume % by adding oxygen gas to air.

With respect to the powder after the firing (the positive electrode active material powder), the measurement was carried out in the same manner as in Example 1, whereby the half-width of the diffraction peak for (110) face in the vicinity of 2θ=66.5±1°, was 0.115°.

The packing press density of this positive electrode active material powder was determined in the same manner as in Example 1, and found to be 3.19 g/cm$^3$.

Two stainless steel simple closed cells were assembled in the same manner as in Example 1 except that the above LiCo$_{0.998}$Ta$_{0.002}$O$_2$ powder was used instead of the LiCo$_{0.998}$Ti$_{0.002}$O$_2$ powder in Example 1.

With respect to these two cells, the measurement was carried out in the same manner as in Example 1, whereby the initial discharge capacity at from 2.5 to 4.3 V at 25° C. was 148 mAh/g, and the capacity retention after 40 charge/discharge cycles, was 96.1%. Further, the capacity developing rate at −10° C. was 75%.

EXAMPLE 4

A cobalt oxyhydroxide powder having an average particle size of 8 μm and a specific surface area of 40 m$^2$/g, a lithium carbonate powder having an average particle size of 22 μm and a specific surface area of 0.64 m$^2$/g and an anatase-type titanium dioxide powder having an average particle size of 0.17 μm and a specific surface area of 35 m$^2$/g, were mixed. The mixing ratio was such that the composition would be LiCo$_{0.994}$Ti$_{0.006}$O$_2$ after firing. These three types of powders were dry-blended and then fired at 890° C. for 15 hours in an atmosphere having the oxygen concentration adjusted to 19 volume % by adding oxygen gas to air.

With respect to the powder after the firing (the positive electrode active material powder), the measurement was carried out in the same manner as in Example 1, whereby the half-width of the diffraction peak for (110) face in the vicinity of 2θ=66.5±1°, was 0.127°.

The packing press density of this positive electrode active material powder was determined in the same manner as in Example 1, and found to be 3.11 g/cm$^3$.

Two stainless steel simple closed cells were assembled in the same manner as in Example 1 except that the above LiCo$_{0.994}$Ti$_{0.006}$O$_2$ powder was used instead of the LiCo$_{0.998}$Ti$_{0.002}$O$_2$ powder in Example 1.

With respect to these two cells, the measurement was carried out in the same manner as in Example 1, whereby the initial discharge capacity at from 2.5 to 4.3 V at 25° C. was 149 mAh/g, and the capacity retention after 40 charge/discharge cycles, was 95.7%. Further, the capacity developing rate at −10° C. was 72%.

EXAMPLE 5

A cobalt oxyhydroxide powder having an average particle size of 10 μm and a specific surface area of 66 m$^2$/g, a lithium carbonate powder having an average particle size of 15 μm and a specific surface area of 1.2 m$^2$/g and a zirconium oxide (ZrO$_2$) powder having an average particle size of 8.1 μm and a specific surface area of 15 m$^2$/g, were mixed. The mixing ratio was such that the composition would be LiCo$_{0.998}$Zr$_{0.002}$O$_2$ after firing. These three types of powders were dry-blended and then fired at 910° C. for 12 hours in an atmosphere having the oxygen concentration adjusted to 28 volume % by adding oxygen gas to air.

With respect to the powder after the firing (the positive electrode active material powder), the measurement was carried out in the same manner as in Example 1, whereby the half-width of the diffraction peak for (110) face in the vicinity of 2θ=66.5±1°, was 0.117°.

The packing press density of this positive electrode active material powder was determined in the same manner as in Example 1, and found to be 3.19 g/cm$^3$.

Two stainless steel simple closed cells were assembled in the same manner as in Example 1 except that the above LiCo$_{0.998}$Zr$_{0.002}$O$_2$ powder was used instead of the LiCo$_{0.998}$Ti$_{0.002}$O$_2$ powder in Example 1.

With respect to these two cells, the measurement was carried out in the same manner as in Example 1, whereby the initial discharge capacity at from 2.5 to 4.3 V at 25° C. was 148 mAh/g, and the capacity retention after 40 charge/discharge cycles, was 95.8%. Further, the capacity developing rate at −10° C. was 68%.

EXAMPLE 6

A cobalt oxyhydroxide powder having an average particle size of 10 μm and a specific surface area of 66 m$^2$/g, a lithium carbonate powder having an average particle size of 15 μm and a specific surface area of 1.2 m$^2$/g and a hafnium oxide (HfO$_2$) powder having an average particle size of 0.4 μm and a specific surface area of 7.2 m$^2$/g, were mixed. The mixing ratio was such that the composition would be LiCo$_{0.998}$Hf$_{0.002}$O$_2$ after firing. These three types of powders were dry-blended and then fired at 910° C. for 12 hours in an atmosphere having the oxygen concentration adjusted to 28 volume % by adding oxygen gas to air.

With respect to the powder after the firing (the positive electrode active material powder), the measurement was carried out in the same manner as in Example 1, whereby the half-width of the diffraction peak for (110) face in the vicinity of 2θ=66.5±1°, was 0.119°.

The packing press density of this positive electrode active material powder was determined in the same manner as in Example 1, and found to be 3.18 g/cm$^3$.

Two stainless steel simple closed cells were assembled in the same manner as in Example 1 except that the above LiCo$_{0.998}$Hf$_{0.02}$O$_2$ powder was used instead of the LiCo$_{0.998}$Ti$_{0.002}$O$_2$ powder in Example 1.

With respect to these two cells, the measurement was carried out in the same manner as in Example 1, whereby the initial discharge capacity at from 2.5 to 4.3 V at 25° C. was 149 mAh/g, and the capacity retention after 40 charge/discharge cycles, was 96.0%. Further, the capacity developing rate at −10° C. was 70%.

EXAMPLE 7

A cobalt oxyhydroxide powder having an average particle size of 8 μm and a specific surface area of 40 m$^2$/g, a lithium carbonate powder having an average particle size of 22 μm and a specific surface area of 0.64 m$^2$/g and a zirconium oxide powder having an average particle size of 8.1 μm and a specific surface area of 16 m$^2$/g, were mixed. The mixing ratio was such that the composition would be LiCo$_{0.994}$Zr$_{0.006}$O$_2$ after firing. These three types of powders were dry-blended and then fired at 890° C. for 15 hours in an atmosphere having the oxygen concentration adjusted to 19 volume % by adding oxygen gas to air.

With respect to the powder after the firing (the positive electrode active material powder), the measurement was carried out in the same manner as in Example 1, whereby the half-width of the diffraction peak for (110) face in the vicinity of 2θ=66.5±1°, was 0.128°.

The packing press density of this positive electrode active material powder was determined in the same manner as in Example 1, and found to be 3.10 g/cm$^3$.

Two stainless steel simple closed cells were assembled in the same manner as in Example 1 except that the above LiCo$_{0.994}$Zr$_{0.006}$O$_2$ powder was used instead of the LiCo$_{0.998}$Ti$_{0.002}$O$_2$ powder in Example 1.

With respect to these two cells, the measurement was carried out in the same manner as in Example 1, whereby the initial discharge capacity at from 2.5 to 4.3 V at 25° C. was 148 mAh/g, and the capacity retention after 40 charge/discharge cycles, was 95.7%. Further, the capacity developing rate at −10° C. was 72%.

EXAMPLE 8

A cobalt oxyhydroxide powder having an average particle size of 10 μm and a specific surface area of 66 m$^2$/g, and a lithium carbonate powder having an average particle size of 15 μm and a specific surface area of 1.2 m$^2$/g, were mixed. The mixing ratio was such that the composition would be LiCoO$_2$ after firing. These three types of powders were dry-blended and then fired at 910° C. for 12 hours in an atmosphere having the oxygen concentration adjusted to 28 volume % by adding oxygen gas to air.

With respect to the powder after the firing (the positive electrode active material powder), the measurement was carried out in the same manner as in Example 1, whereby the half-width of the diffraction peak for (110) face in the vicinity of 2θ=66.5±1°, was 0.098°.

The packing press density of this positive electrode active material powder was determined in the same manner as in Example 1, and found to be 3.10 g/cm$^3$.

Two stainless steel simple closed cells were assembled in the same manner as in Example 1 except that the above LiCoO$_2$ powder was used instead of the LiCo$_{0.998}$Ti$_{0.002}$O$_2$ powder in Example 1.

With respect to these two cells, the measurement was carried out in the same manner as in Example 1, whereby the initial discharge capacity at from 2.5 to 4.3 V at 25° C. was 149 mAh/g, and the capacity retention after 40 charge/discharge cycles, was 94.8%. Further, the capacity developing rate at −10° C. was 54%.

EXAMPLE 9

A cobalt oxyhydroxide powder having an average particle size of 15 μm and a specific surface area of 60 m$^2$/g, and a lithium carbonate powder having an average particle size of 15 µm and a specific surface area of 1.2 m²/g, were mixed. The mixing ratio was such that the composition would be $LiCoO_2$ after firing. These two types of powders were dry-blended and then fired at 910° C. for 12 hours in an atmosphere having the oxygen concentration adjusted to 28 volume % by adding oxygen gas to air.

With respect to the powder after the firing (the positive electrode active material powder), the measurement was carried out in the same manner as in Example 1, whereby the half-width of the diffraction peak for (110) face in the vicinity of $2\theta=66.5\pm1°$, was 0.091°.

The packing press density of this positive electrode active material powder was determined in the same manner as in Example 1, and found to be 3.18 g/cm³.

Two stainless steel simple closed cells were assembled in the same manner as in Example 1 except that the above $LiCoO_2$ powder was used instead of the $LiCo_{0.998}Ti_{0.002}O_2$ powder in Example 1.

With respect to one cell among them, charging was carried out to 4.3 V by a load current of 75 mA per g of the positive electrode active material at 25° C., and discharging was carried out to 2.5 V at a load current of 75 mA per g of the positive electrode active material, whereby the initial discharge capacity was obtained. Further, with respect to this cell, the charge/discharge cycle test was continuously carried out 30 times. As a result, the initial discharge capacity at from 2.5 to 4.3 V at 25° C. was 149 mAh/g, and the capacity retention after 30 charge/discharge cycles, was 96.3%.

Further, with respect to the other cell, charging was carried out to 4.3 V at a constant current of 0.2 mA per 1 cm² of the positive electrode area and disassembled in the argon grove box, whereupon the positive electrode sheet after charging was taken out. The positive electrode sheet was washed and then punched out in a size of 3 mm, and it was sealed together with EC in an aluminum capsule. The temperature was raised at a rate of 5° C./min by a scanning differential calorimeter, whereby the heat generation initiation temperature was measured. As a result, the heat generation initiation temperature was 165° C.

EXAMPLE 10

A cobalt oxyhydroxide powder having an average particle size of 8 µm and a specific surface area of 50 m²/g, and a lithium carbonate powder having an average particle size of 15 µm and a specific surface area of 1.2 m²/g, were mixed. The mixing ratio was such that the composition would be $LiCoO_2$ after firing. These two types of powders were dry-blended and then fired at 910° C. for 12 hours in an atmosphere having the oxygen concentration adjusted to 28 volume % by adding oxygen gas to air.

With respect to the powder after the firing (the positive electrode active material powder), the measurement was carried out in the same manner as in Example 1, whereby the half-width of the diffraction peak for (110) face in the vicinity of $2\theta=66.5\pm1°$, was 0.095°.

The packing press density of this positive electrode active material powder was determined in the same manner as in Example 1, and found to be 3.01 g/cm³.

Two stainless steel simple closed cells were assembled in the same manner as in Example 1 except that the above $LiCoO_2$ powder was used instead of the $LiCo_{0.998}Ti_{0.002}O_2$ powder in Example 1.

With respect to one of them, the initial electric capacity of the cell and the capacity after 30 cycles were obtained in the same manner as in Example 9, whereby the initial discharge capacity at from 2.5 to 4.3 V at 25° C. was 148 mAh/g, and the capacity retention after 30 charge/discharge cycles, was 97.0%.

Further, in the same manner as in Example 9, with respect to the other cell, the reactivity of the charged positive electrode active material with the electrolyte was determined, whereby the heat generation initiation temperature was 169° C.

EXAMPLE 11

A cobalt oxyhydroxide powder having an average particle size of 12 µm and a specific surface area of 66 m²/g, and a lithium carbonate powder having an average particle size of 28 µm and a specific surface area of 0.43 m²/g, were mixed. The mixing ratio was such that the composition would be $LiCoO_2$ after firing. These two types of powders were dry-blended and then fired at 890° C. for 18 hours in an atmosphere having the oxygen concentration adjusted to 19 volume % by adding oxygen gas to air.

With respect to the powder after the firing (the positive electrode active material powder), the measurement was carried out in the same manner as in Example 1, whereby the half-width of the diffraction peak for (110) face in the vicinity of $2\theta=66.5\pm1°$, was 0.083°.

The packing press density of this positive electrode active material powder was determined in the same manner as in Example 1, and found to be 3.12 g/cm³.

Two stainless steel simple closed cells were assembled in the same manner as in Example 1 except that the above $LiCoO_2$ powder was used instead of the $LiCo_{0.998}Ti_{0.002}O_2$ powder in Example 1.

With respect to one of them, the initial electric capacity of the cell and the capacity after 30 cycles were obtained in the same manner as in Example 9, whereby the initial discharge capacity at from 2.5 to 4.3 V at 25° C. was 148 mAh/g, and the capacity retention after 30 charge/discharge cycles, was 95.3%.

Further, in the same manner as in Example 9, with respect to the other cell, the reactivity of the charged positive electrode active material with the electrolyte was determined, whereby the heat generation initiation temperature was 173° C.

EXAMPLE 12

$LiCoO_2$ was synthesized in the same manner as in Example 9 except that a cobalt oxide $(Co_3O_4)$ powder having an average particle size of 8 µm and a specific surface area of 0.66 m²/g was used instead of cobalt oxyhydroxide.

With respect to the powder after the firing (the positive electrode active material powder), the measurement was carried out in the same manner as in Example 9, whereby the half-width of the diffraction peak for (110) face in the vicinity of $2\theta=66.5\pm1°$, was 0.133°.

The packing press density of this positive electrode active material powder was determined in the same manner as in Example 1, and found to be 2.75 g/cm³.

Two stainless steel simple closed cells were assembled in the same manner as in Example 1 except that the above $LiCoO_2$ powder was used instead of the $LiCoO_2$ powder in Example 9.

With respect to one of them, the initial electric capacity of the cell and the capacity after 30 cycles were obtained in the same manner as in Example 9, whereby the initial discharge capacity at from 2.5 to 4.3 V at 25° C. was 148 mAh/g, and the capacity retention after 30 charge/discharge cycles, was 96.4%.

Further, in the same manner as in Example 9, with respect to the other cell, the reactivity of the charged positive electrode active material with the electrolyte was determined, whereby the heat generation initiation temperature was 155° C.

EXAMPLE 13

$LiCoO_2$ was synthesized in the same manner as in the above Example 9 except that a cobalt oxyhydroxide powder having an average particle size of 30 μm and a specific surface area of 7 m$^2$/g was used instead of the cobalt oxyhydroxide powder having an average particle size of 15 μm and a specific surface area of 60 m$^2$/g.

With respect to the powder after the firing (the positive electrode active material powder), the measurement was carried out in the same manner as in Example 1, whereby the half-width of the diffraction peak for (110) face in the vicinity of 2θ=66.5±1°, was 0.118°.

The packing press density of this positive electrode active material powder was determined in the same manner as in Example 1, and found to be 3.15 g/cm$^3$.

Two stainless steel simple closed cells were assembled in the same manner as in Example 1 except that the above $LiCoO_2$ powder was used instead of the $LiCoO_2$ powder in Example 9.

With respect to one of them, the initial electric capacity of the cell and the capacity after 30 cycles were obtained in the same manner as in Example 9, whereby the initial discharge capacity at from 2.5 to 4.3 V at 25° C. was 137 mAh/g, and the capacity retention after 30 charge/discharge cycles, was 92.3%.

Further, in the same manner as in Example 9, with respect to the other cell, the reactivity of the charged positive electrode active material with the electrolyte was determined, whereby the heat generation initiation temperature was 158° C.

EXAMPLE 14

$LiCoO_2$ was synthesized in the same manner as in the above Example 9 except that the firing at a temperature of 910° C. for 12 hours in Example 9 was changed to the firing at 780° C. for 12 hours.

With respect to the powder after the firing (the positive electrode active material powder), the measurement was carried out in the same manner as in Example 1, whereby the half-width of the diffraction peak for (110) face in the vicinity of 2θ=66.5±1°, was 0.138°.

The packing press density of this positive electrode active material powder was determined in the same manner as in Example 1, and found to be 2.98 g/cm$^3$.

Two stainless steel simple closed cells were assembled in the same manner as in Example 1 except that the above $LiCoO_2$ powder was used instead of the $LiCoO_2$ powder in Example 9.

With respect to one of them, the initial electric capacity of the cell and the capacity after 30 cycles were obtained in the same manner as in Example 9, whereby the initial discharge capacity at from 2.5 to 4.3 V at 25° C. was 147 mAh/g, and the capacity retention after 30 charge/discharge cycles, was 96.5%.

Further, in the same manner as in Example 9, with respect to the other cell, the reactivity of the charged positive electrode active material with the electrolyte was determined, whereby the heat generation initiation temperature was 156° C.

EXAMPLE 15

$LiCo_{0.95}Ti_{0.05}O_2$ was synthesized in the same manner as in Example 1 except that the mixing ratio of the cobalt oxyhydroxide powder, the lithium carbonate powder and the anatase-type titanium dioxide powder was changed so that the composition would be $LiCo_{0.95}Ti_{0.05}O_2$ after firing.

With respect to the powder after the firing (the positive electrode active material powder), the measurement was carried out in the same manner as in Example 1, whereby the half-width of the diffraction peak for (110) face in the vicinity of 2θ=66.5±1°, was 0.188°.

Two stainless steel simple closed cells were assembled in the same manner as in Example 0.1 except that the above $LiCo_{0.95}Ti_{0.05}O_2$ powder was used instead of the $LiCo_{0.998}Ti_{0.002}O_2$ powder in Example 1.

With respect to these two cells, the measurement was carried out in the same manner as in Example 1, whereby the initial electric capacity at from 2.5 to 4.3 V at 25° C. was 141 mAh/g, and the capacity retention after 40 charge/discharge cycles, was 93.6%. Further, the capacity developing rate at −10° C. was 68%.

EXAMPLE 16

$LiCo_{0.95}Zr_{0.05}O_2$ was synthesized in the same manner as in Example 5 except that the mixing ratio of the cobalt oxyhydroxide powder, the lithium carbonate powder and zirconium oxide was changed so that the composition would be $LiCo_{0.95}Zr_{0.05}O_2$ after firing.

With respect to the powder after the firing (the positive electrode active material powder), the measurement was carried out in the same manner as in Example 5, whereby the half-width of the diffraction peak for (110) face in the vicinity of 2θ=66.5±1°, was 0.183°.

Two stainless steel simple closed cells were assembled in the same manner as in Example 1 except that the above $LiCo_{0.95}Zr_{0.05}O_2$ powder was used instead of the $LiCo_{0.998}Zr_{0.002}O_2$ powder in Example 5.

With respect to these two cells, the measurement was carried out in the same manner as in Example 5, whereby the initial discharge capacity at from 2.5 to 4.3 V at 25° C. was 140 mAh/g, and the capacity retention after 40 charge/discharge cycles, was 93.8%. Further, the capacity developing rate at −10° C. was 68%.

INDUSTRIAL APPLICABILITY

According to the present invention, a hexagonal lithium cobalt composite oxide having excellent properties as a positive electrode active material for a lithium secondary cell which has a large electric capacity, good low temperature discharge characteristics, excellent charge/discharge cycle durability and high safety, and an efficient and advantageous process for producing such a lithium cobalt composite oxide, will be provided.

Further, a positive electrode for a lithium secondary cell, employing the hexagonal lithium cobalt composite oxide as an active material, and a lithium secondary cell using such a positive electrode, which is excellent in the properties such as the electric capacity, discharge characteristics, charge/discharge cycle durability, capacity density, safety and low temperature operation efficiency, will be provided.

The invention claimed is:

1. A process for producing a hexagonal lithium-cobalt composite oxide for a lithium secondary cell, which comprises:

dry blending a cobalt oxyhydroxide powder having an average particle size of from 1 to 20 μm and a specific surface area of from 2 to 200 m²/g, a lithium carbonate powder having an average particle size of from 1 to 50 μm and a specific surface area of from 0.1 to 10 m²/g, and a powder of an oxide of metal element M having an average particle size of at most 10 μm and a specific surface area of from 1 to 100 m²/g; and firing a mixture of the powders at a temperature of from 850 to 1,000° C. in an oxygen-containing atmosphere, wherein the hexagonal lithium-cobalt composite oxide is represented by the formula $LiCo_{1-x}M_xO_2$, wherein x is $0.0005 \leq x \leq 0.02$ and M is at least one member selected from the group consisting of Ta, Ti, Nb, Zr and Hf, and which has a half-width of the diffraction peak for (110) face at $2\theta=66.5\pm1°$, of from 0.080 to 0.180°, as measured by the X-ray diffraction using $CuK_\alpha$ as a ray source.

2. The process according to claim 1, wherein the mixture is fired at time ranging from 4 to 30 hours.

3. The process according to claim 1, wherein the half-width of the diffraction peak for (110) face ranges from 0.100 to 0.165°.

4. The process according to claim 1, wherein a packing press density of the hexagonal lithium-cobalt composite oxide ranges from 2.90 to 3.35 g/cm³.

5. The process according to claim 1, wherein a packing press density of the hexagonal lithium-cobalt composite oxide ranges from 3.05 to 3.25 g/cm³.

6. The process according to claim 1, wherein the cobalt oxyhydroxide powder has an average particle size ranging from 4 to 15 μm.

7. The process according to claim 1, wherein the cobalt oxyhydroxide powder has a specific surface area ranging from 20 to 100 m²/g.

8. The process according to claim 1, wherein the lithium carbonate powder has an average particle size ranging from 5 to 30 μm.

9. The process according to claim 1, wherein the lithium carbonate powder has a specific surface area ranging from 0.3 to 3 m²/g.

10. The process according to claim 1, wherein the mixture is fired at a time ranging from 8 to 20 hours.

11. The process according to claim 1, wherein an oxygen concentration in the oxygen-containing atmosphere ranges from 10 to 100 volume %.

* * * * *